:::

United States Patent [19]

Schnaibel et al.

[11] Patent Number: 5,901,552
[45] Date of Patent: May 11, 1999

[54] METHOD OF ADJUSTING THE AIR/FUEL RATIO FOR AN INTERNAL COMBUSTION ENGINE HAVING A CATALYTIC CONVERTER

[75] Inventors: Eberhard Schnaibel, Hemmingen; Erich Schneider, Kirchheim; Rüdiger Deibert, Tamm, all of Germany; Hans Peter Geering, Winterthur, Switzerland; Christian Roduner, Zürich, Switzerland; Esfandiar Shafai, Hittnau, Switzerland

[73] Assignee: Robert Bosch GmbH, Stuttgart, Germany

[21] Appl. No.: 08/802,904

[22] Filed: Feb. 20, 1997

[30] Foreign Application Priority Data

Feb. 23, 1996 [DE] Germany .......................... 196 06 652

[51] Int. Cl.$^6$ .................................................. F01N 3/00
[52] U.S. Cl. ................... 60/274; 60/285; 60/276; 73/118.1
[58] Field of Search ............. 60/274, 277, 285, 60/276; 73/118.1

[56] References Cited

U.S. PATENT DOCUMENTS

| 5,207,056 | 5/1993 | Benninger . | |
| 5,224,345 | 7/1993 | Schnaibel et al. . | |
| 5,335,538 | 8/1994 | Blischke et al. | 73/118.1 |
| 5,390,490 | 2/1995 | Brooks | 60/276 |
| 5,404,718 | 4/1995 | Orzel et al. | 60/276 |
| 5,602,737 | 2/1997 | Sindano et al. | 60/285 |
| 5,609,023 | 3/1997 | Katoh et al. | 60/285 |
| 5,715,678 | 2/1998 | Aronica et al. | 60/277 |

*Primary Examiner*—Thomas E. Denion
*Attorney, Agent, or Firm*—Walter Ottesen

[57] ABSTRACT

The invention is directed to a method for adjusting the air/fuel ratio for an internal combustion engine having a catalytic converter connected downstream thereof which is capable of storing oxygen. In this method, the oxygen components in the exhaust gas of the engine are detected upstream of the catalytic converter and downstream thereof and the adjustment of the fuel/air ratio is influenced. In the method, a measure for the instantaneous oxygen fill level of the catalytic converter is determined from the above-mentioned oxygen components with the aid of a model. Data as to the state of deterioration of the catalytic converter are derived from the model parameters. The air/fuel ratio is so adjusted that the oxygen fill level of the catalytic converter is held to a constant mean level.

11 Claims, 2 Drawing Sheets

METHOD OF ADJUSTING THE AIR/FUEL RATIO FOR AN INTERNAL COMBUSTION ENGINE HAVING A CATALYTIC CONVERTER

FIELD OF THE INVENTION

The invention relates to a method for adjusting the fuel/air ratio for an internal combustion engine equipped with a catalytic converter which has an oxygen storage capacity.

BACKGROUND OF THE INVENTION

It is generally known to convert toxic components of exhaust gases of an internal combustion engine as far as possible into non-toxic gases. Such toxic components are, for example, HC, NOx and CO which are converted by a catalytic converter mounted in the exhaust-gas system of the engine. It is decisive for the so-called conversion degree that the oxygen content of the exhaust gas lies within optimal values. For a so-called three-way catalytic converter, these optimal values lie within a narrow range about the value which corresponds to a fuel/air mixture of $\lambda=1$. In order to maintain this narrow range, it is conventional to control the fuel/air ratio for an internal combustion engine by means of oxygen probes which are mounted in the exhaust-gas system of the engine. In order to accelerate the control operation, especially in transition regions, a determination of a so-called precontrol value based on operating characteristic variables of the engine is made especially on the basis of the air quantity Q supplied to the engine and the engine speed n. This determination of the precontrol value is in addition to the control based on the signal of the oxygen probe. The determination of the air quantity Q can take place in different ways such as via determination of the opening angle of the throttle flap or based on the signal of an air-quantity sensor.

The precontrol value, which is determined on the basis of Q and n, is corrected in accordance with the signal of the oxygen probe in such a manner that the optimal fuel/air mixture is determined. With the corrected signal, a fuel-metering device is driven which supplies the optimal quantity of fuel to the engine. This can take place, for example, by controlling the injection valves with an injection pulse-width ti.

Furthermore, systems are known which utilize two lambda probes as oxygen probes to control the fuel/air mixture. A first one of these probes is arranged forward of the catalytic converter and a second probe is connected downstream thereof. The signal of the second lambda probe is compared to a desired value and the difference of these two values is integrated and the value obtained in this manner operates on the desired value of the control based on the signal of the lambda probe. Such a system is disclosed, for example, in U.S. Pat. No. 5,224,345. It has also been shown that present day three-way catalytic converters exhibit a capability to store gas especially a capability to store oxygen. In this context, U.S. Pat. No. 5,207,056 discloses that the gas storage capacity of a catalytic converter is to be considered for the control. In accordance with this teaching, not only the instantaneous value of $\lambda$ forward of the catalytic converter is controlled to a desired value but the integral of the control deviation is also controlled to a desired value via a superposed control with the aid of the probe rearward of the catalytic converter.

SUMMARY OF THE INVENTION

It is an object of the invention to consider the instantaneous fill level of the catalytic converter with oxygen during the adjustment of the fuel/air ratio and to make possible a diagnosis of the catalytic converter because of the close coupling of the oxygen storage capacity to the state of deterioration of the converter.

The method of the invention of adjusting the air/fuel ratio for an internal combustion engine has an exhaust gas system for discharging exhaust gas generated during operation of the engine. The exhaust gas system includes a catalytic converter adapted to store components of oxygen of the exhaust gas and the method includes the steps of: detecting the oxygen components in the exhaust gas upstream and downstream of the catalytic converter; utilizing a model for determining a measure for the instantaneous oxygen fill level of the catalytic converter from the detected oxygen components; deriving data as to the state of deterioration of the catalytic converter from the model parameters; and, adjusting the air/fuel ratio to hold the oxygen fill level of the catalytic converter at a constant mean level.

The basic idea of the invention is to provide a continuous control of the $\lambda$ forward of the converter with the aid of a linear broadband probe so that a determination of the oxygen input into the catalytic converter and the oxygen output therefrom can be made. Stated otherwise, it is an object of the invention to hold the oxygen fill level of the catalytic converter to a desired value. For this purpose, a further control loop is superposed on the lambda control forward of the catalytic converter. By evaluating a signal of the probe mounted rearward of the catalytic converter, the additional control loop corrects the desired value of the control which operates on the basis of the signal of the forward probe. This superposed control must be in accordance with the time-varying performance of the catalytic converter. That is, more specifically, the parameters of the control must be made to track the state of deterioration of the catalytic converter. For this purpose, simulated parameters of a suitable mathematically simulated storage for the catalytic converter are determined on-line via a mathematically simulated method for parameter identification from the measured oxygen signal rearward of the catalytic converter. These parameters define a measure for the actual valid characteristics of the converter and permit a very rapid determination of the state of the converter because they are determined on-line.

BRIEF DESCRIPTION OF THE DRAWINGS

The invention will now be described with reference to the drawings wherein.

DESCRIPTION OF THE PREFERRED EMBODIMENTS OF THE INVENTION

The three-way catalytic converter is viewed as an oxygen store. Viewing the catalytic converter in this manner leads to a simplified model of the three-way converter which can be characterized by three parameters which describe the filling and the emptying of the oxygen store. These three parameters can be identified on-line with the aid of a recursive Markov parameter estimate on the basis of the measured lambda values upstream and downstream of the converter. From these three parameters, the relative oxygen fill level of the catalytic converter can be determined. This relative oxygen fill level is applied for the control.

The three-way catalytic converter can be defined mathematically as a limited integrator for control purposes because the catalytic converter is viewed only as an oxygen store. In this connection, reference can be made to FIG. 1. The upper limit is characterized by a full three-way catalytic converter which can accept no further oxygen. The lower limit characterizes a catalytic converter state in which no more oxygen can be released.

Figure 1:
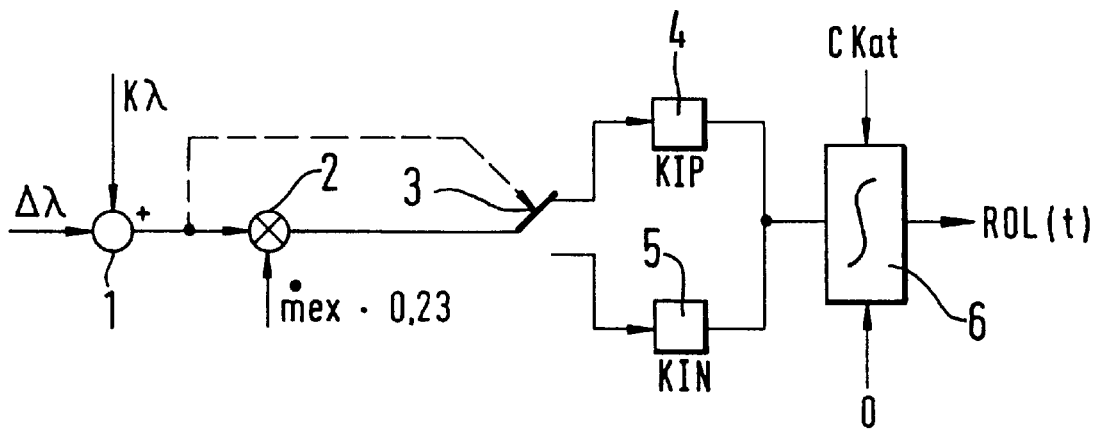
FIG. 1 is a simplified oxygen storage simulation of a catalytic converter.

The oxygen amount inputted $m^*O_2$ (t) can be computed as the product of the deviation $\Delta\lambda VK$ of the actual lambda from the stoichiometric ratio $\lambda=1$ and the exhaust-gas mass flow $m^*(t)$. The exhaust-gas mass flow can be obtained by dynamic correction of the intake pipe mass flow. In this way, the oxygen input into the catalytic converter can be quantified by utilizing a broadband lambda probe forward of the converter. Furthermore, it is assumed that the capability of the catalytic converter to accept oxygen in general deviates from the capability of the converter to release oxygen. For the model of the limited integrator, this means that two integrator speed units KIP(t) and KIN(t) must be used. KIP is active in the storage phase when $\Delta\lambda$ (t) is positive while KIN is active in the emptying phase when $\Delta\lambda$ is negative. The quantity $\Delta\lambda$ differs as it is measured by the forward probe by an additive offset $K\lambda$ from the quantity $\Delta\lambda$. The quantity $\Delta\lambda$ is the basis for the oxygen storage operations in the catalytic converter model. These relationships are shown in FIG. 1.

The deviation $\Delta\lambda$ of the signal of the forward probe from the value for the stoichiometric composition as well as a value for the additive offset $K\lambda$ are supplied to a first logic element 1. The sum of both values is multiplied in a logic element 2 with the exhaust-gas mass flow, which is also weighted with a factor 0.23 which corresponds to the oxygen component in the intake air. Depending upon the sign of the control deviation $\Delta\lambda$, either a positive integrator speed 4 or a negative integrator speed 5 is preselected for the limited integrator 6 by means of a switch 3. The output variable ROL(t) of this model corresponds to the relative oxygen fill level in the catalytic converter defined as the storage oxygen mass relative to the actual oxygen storage capacity (OSC) of the catalytic converter.

The parameters KIP and KIN can change as a function of time. These parameters vary in dependence upon temperature changes and upon changes in the oxygen storage capacity OSC which are caused by the deterioration of the catalytic converter. From the last dependency, it follows that the parameters KIP and KIN can be applied for evaluating the oxygen storage capacity and therefore of the state of deterioration of the catalytic converter. The lower integrator limit in FIG. 1 is set to zero while the upper limit is set to an initial oxygen storage capacity CK at of the catalytic converter. The selection of these limits causes the situation that the initial values of the parameters KIP and KIN lie approximately at 1. Values of greater than 1 are expected for a catalytic converter which is deteriorated.

As mentioned initially herein, the objective of the adaptive control is to adjust the fuel/air ratio so that a pregiven oxygen fill level is adjusted in the catalytic converter. In this context, an oxygen fill level of approximately 50% is targeted as a preferred embodiment. For this fill level, the spacing of the fill level to the limits of the three-way catalytic converter is a maximum and therefore, the catalytic converter can optimally compensate upstream changes of the fuel/air ratio $\lambda$ in both directions (rich and lean). A problem here is that the oxygen fill level in the catalytic converter cannot be directly viewed.

Figure 2:
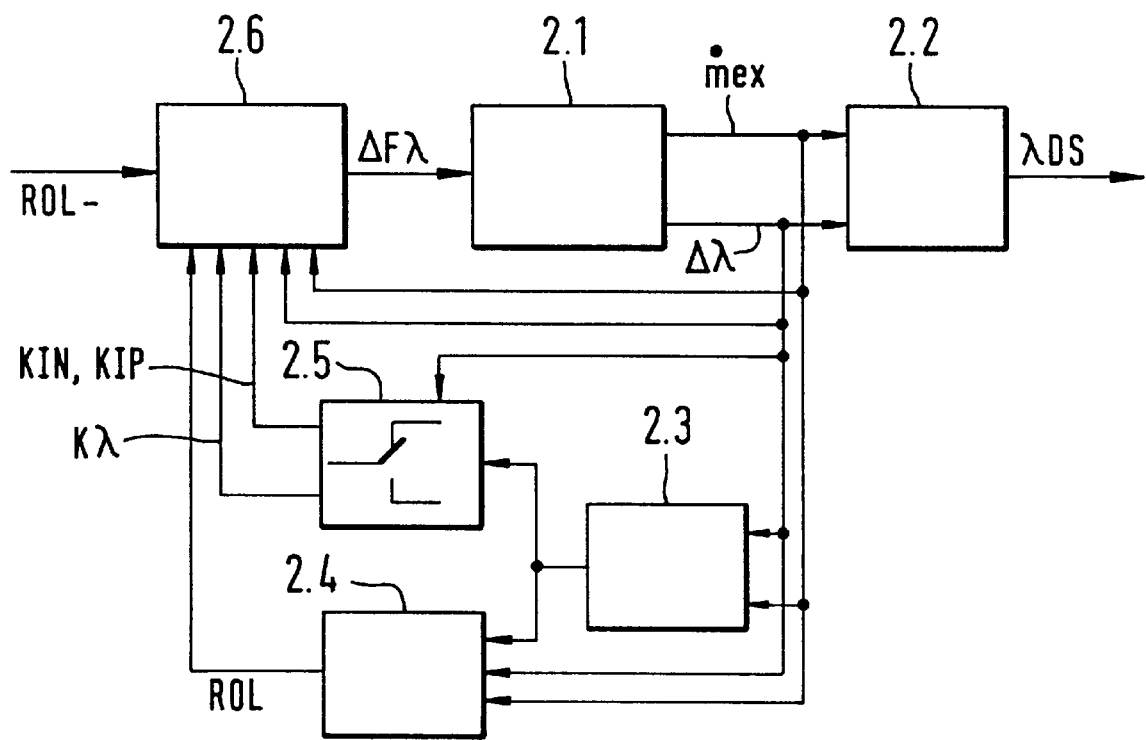
FIG. 2 is a block diagram of an adaptive control loop in accordance with the invention.

The only catalytic converter output signal which can be accessed is the signal of the probe mounted downstream from which only the following data can be derived: when ELL<$\Delta\lambda$DS<EUL, then the oxygen fill level lies between the upper and lower limits. When $\Delta\lambda$DS>EUL, then the oxygen fill level is at the upper limit. When $\Delta\lambda$DS<ELL, the oxygen fill level is at the lower limit. EUL and ELL are threshold values for the determination that the oxygen fill level has reached the upper limit or has reached the lower limit. $\Delta\lambda$DS is the offset of the measured $\lambda$ downstream of the catalytic converter from the value 1 which corresponds to the stoichiometric ratio. An indirect adaptive control can be used as shown in FIG. 2 to determine the relative oxygen fill level and to maintain the fill level at 50%.

In this arrangement, the block 2.1 corresponds to the engine and block 2.2 indicates the three-way catalytic converter. The block 2.6 represents the primary controller and the block 2.3 represents the parameter estimate. The block 2.4 represents the catalytic converter model and the block 2.5 supplies input variables from the parameter estimate which are also processed in controller 2.6. The parameters in block 2.3 are obtained via a recursive Markov parameter estimate RME carried out on-line. The estimated relative oxygen fill level ROL is formed in the block 2.4 which corresponds to the oxygen storage model. The control variable in this schematic is the relative oxygen fill level ROL and is an estimated signal. This differs from the control arrangements of typical indirect adaptive control mechanisms wherein the primary controller directly processes a measured variable.

The above difference can cause the problem that when the estimated parameters deviate from the actual parameters, the true oxygen fill level of the three-way catalytic converter can come up to the limits via the control, that is, this situation can lead to an empty or a full catalytic converter. This problem can be solved in that the estimated relative fill level is set to the actual limit value as it is detected via a lambda probe mounted downstream.

Figure 3:
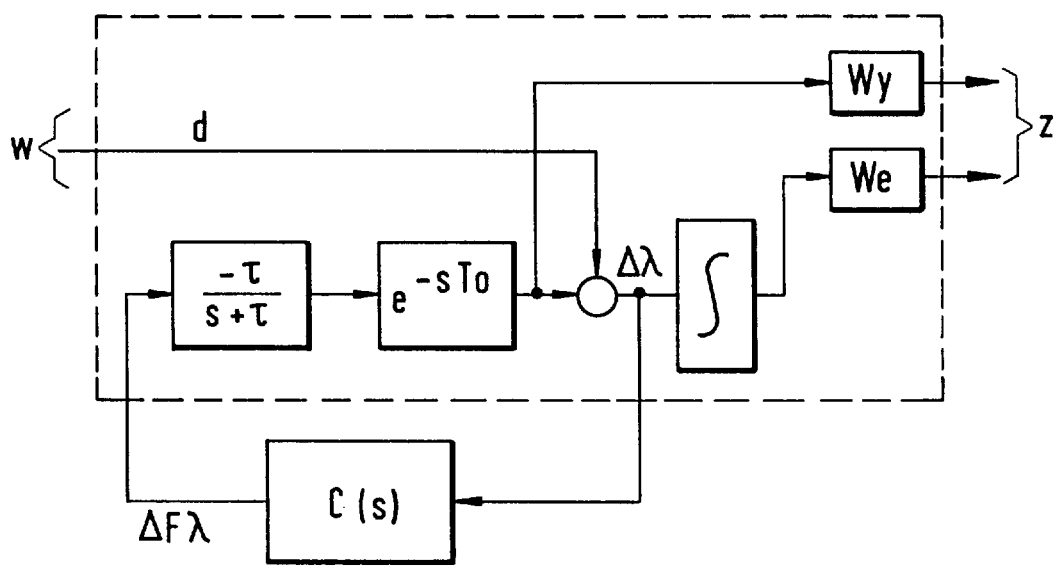
FIG. 3 is a schematic showing the H infinity method for designing the primary controller; and, FIG. 4 is a schematic of an embodiment of the primary controller.

In the manner described above, the controller as well as the algorithm are to a certain extent stimulated to provide parameter identification. The H infinity method of FIG. 3 can be used to design the primary controller. Here, the three-way catalytic converter is viewed as a pure integrator. The engine is simulated with a series circuit of a lowpass filter and a time delay, which is approximated by a finite rational transfer function, in order to solve the H infinity problem. The control variable of the engine is assumed as a lambda factor $\Delta F\lambda$. The sum $1+\Delta F\lambda$ corresponds to the correction factor with which the injection duration is corrected. For the H infinity problem, two weighted transfer functions WES and WYS are used. For a corresponding selection of the transfer functions, the following $$C(S) = G1 + \frac{G2 \cdot 1}{s} + \frac{G3 \cdot 1}{s^2}.$$

Figure 4:
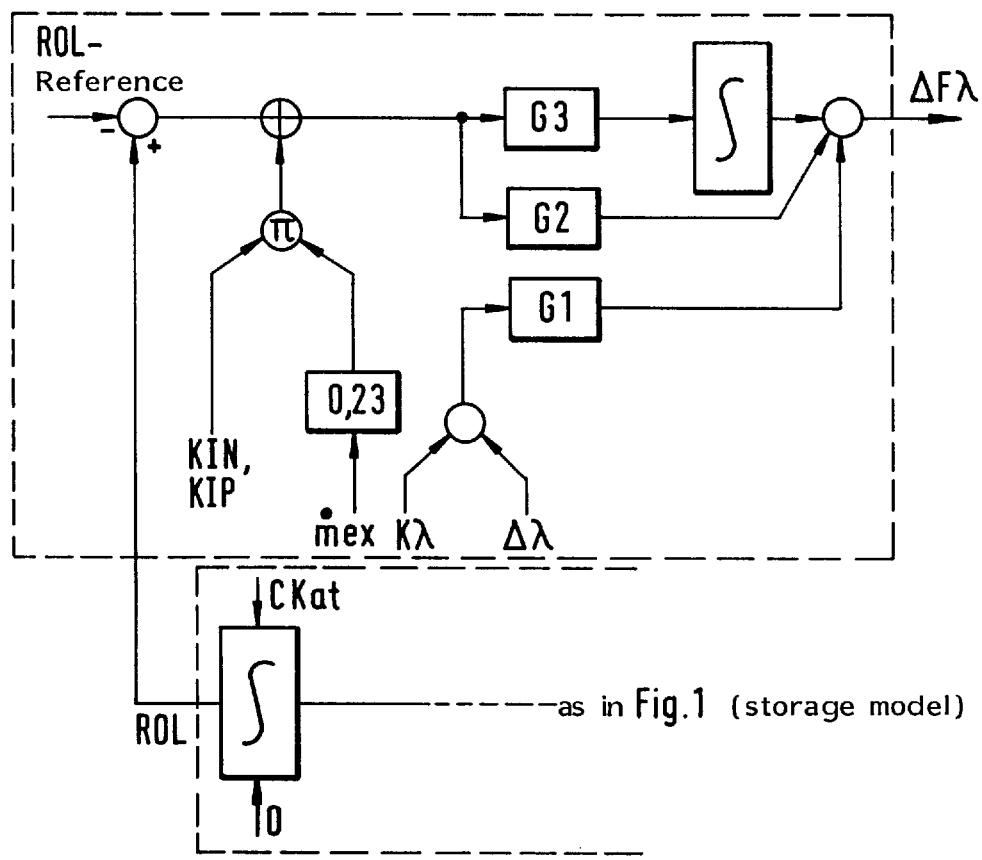

As shown in FIG. 4, the controller CS is realized by utilizing the primary controller 2.6 and the block 2.4 from FIG. 2. The parameters KIP, KIN and $K\lambda$ are recursively identified in block RME of FIG. 2, that is, the block 2.3. The recursive steps are triggered in that the oxygen fill level has passed its upper limit or its lower limit. Stated otherwise, the basic idea of the invention can also be described as follows.

First, the oxygen amount inputted into a catalytic converter is determined from the exhaust-gas mass flow and the deviation of the actual lambda from the stoichiometric ratio $\lambda=1$. In this way, the oxygen amount inputted into the catalytic converter can be quantified by utilizing a broadband lambda probe forward of the converter. In this way, the control path of the control forward of the converter can be described by a linear transfer element and, via a mathematical simulation of the controller design, the two control objectives of rapidly controlling out lambda disturbances and balancing the input and output of oxygen of the catalytic converter can be developed optimally. As a basis of the design, the H infinity method can be used, for example, which generates the coefficients G1 to G3 of FIG. 4. The control forward of the converter is identified a priori because of the identified transfer performance of the engine since these model parameters are only subjected to very slow fluctuations. Modeling or simulating the converter storage performance takes place with the aid of a normed quantity (integrator) for the storage capacity and two through-flow constants KIN and KIP which separately describe the positive or negative oxygen intake in the catalytic converter. To complete the model, an offset constant K$\lambda$ is additionally considered in the model. The two through-flow constants KIN and KIP as well as K$\lambda$ can be determined from the measurable signals $\lambda$VK and $\lambda$HK via the method of parameter identification. A separate procedure here is the use of the method of the smallest squares having time-dependent varying weighting of the error of the model prediction (Markov estimate). Via the recursive formulation of this identification algorithm, an update of the estimated values KIN, KIP can take place in each scanning step.

The parameters KIN, KIP and K$\lambda$ are now, on the one hand, utilized for control functions. These control functions are the compensation of steady-state inaccuracies of the probe signal forward of the converter and, in combination with the catalytic converter model, the input of a desired value for maintaining a defined catalytic converter fill level. In this way, it is ensured that by utilizing the actual valid parameters of the converter model, the control at each time point is optimally correctly matched to the particular state of the catalytic converter. At the same time, information as to the state of the catalytic converter can be provided by evaluating the time traces of the estimated through-flow constants KIN and KIP. In the simplest case, a threshold value monitoring of these values is sufficient.

It is understood that the foregoing description is that of the preferred embodiments of the invention and that various changes and modifications may be made thereto without departing from the spirit and scope of the invention as defined in the appended claims.

What is claimed is:

1. A method of adjusting the air/fuel ratio for an internal combustion engine having an exhaust gas system for discharging exhaust gas generated during operation of the engine, the exhaust gas system including a catalytic converter adapted to store components of oxygen of the exhaust gas, the method comprising the steps of:

detecting the oxygen components in the exhaust gas upstream and downstream of said catalytic converter;

utilizing a model for determining a measure for the instantaneous oxygen fill level of said catalytic converter from the detected oxygen components;

deriving data as to the state of deterioration of said catalytic converter from the model parameters; and, adjusting the air/fuel ratio to hold the oxygen fill level of said catalytic converter at a level between an upper limit (EUL) and a lower limit (ELL).

2. The method of claim 1, wherein the oxygen component upstream of said catalytic converter is detected with an exhaust-gas probe having a linear signal characteristic as a function of $\lambda$ over a wide lambda range.

3. The method of claim 2, wherein the storage performance of said catalytic converter is simulated by integrating a measure for the oxygen amount inputted into said catalytic converter.

4. The method of claim 3, wherein a quantity is formed as a measure for the oxygen amount inputted; and, said quantity is proportional to the product of the deviation $\Delta\lambda$ and the exhaust-gas flow and said deviation $\Delta\lambda$ being the deviation of the actual oxygen content measured upstream of said catalytic converter from the value of the oxygen content for a stoichiometric mixture composition.

5. The method of claim 4, wherein said exhaust-gas flow is determined from the measured intake air mass flow.

6. The method of claim 1, wherein said oxygen fill level is maintained at 50%.

7. A method of adjusting the air/fuel ratio for an internal combustion engine having an exhaust gas system for discharging exhaust gas generated during operation of the engine, the exhaust gas system including a catalytic converter adapted to store components of oxygen of the exhaust gas, the method comprising the steps of:

detecting the oxygen components in the exhaust gas upstream and downstream of said catalytic converter;

utilizing a model for determining a measure for the instantaneous oxygen fill level of said catalytic converter from the detected oxygen components;

deriving data to the state of deterioration of said catalytic converter from the model parameters;

adjusting the air/fuel ratio to hold the oxygen fill level of said catalytic converter at a level between an upper limit (EUL) and a lower limit (ELL); and, wherein:

the oxygen component upstream of said catalytic converter is detected with an exhaust-gas probe having a linear signal charactertstic as a function of $\lambda$ over a wide lambda range;

the storage performance or said catalytic converter is simulated by integrating a measure for the oxygen amount inputted into said catalytic converter;

a quantity is formed as a measure for the oxygen amount inputted; and, said quantity is proportional to the product of the deviation $\Delta\lambda$ and the exhaust-gas flow and said deviation $\Delta\lambda$ being the deviation of the actual oxygen content measured upstream of said catalytic converter from the value of the oxygen content for a stoichiometric mixture composition;

a positive deviation $\Delta\lambda$ is integrated at another integration speed than the integration of a negative deviation $\Delta\lambda$; and, the measured deviation $\Delta\lambda$ is corrected additively with a parameter K$\lambda$ in advance of the integration.

8. The method of claim 7, wherein the parameters KIP, KIN and K$\lambda$ are determined from the oxygen components $\lambda$VK and $\lambda$HK utilizing a method of parameter identification; and, said oxygen components $\lambda$VK and $\lambda$HK being detected forward of and rearward of said catalytic converter, respectively.

9. The method of claim 8, wherein the parameter identification is determined by utilizing a method of the smallest square with time-dependent varying weighting of the error of the model prediction (Markov estimate).

10. The method of claim 8, wherein the time-dependent traces of the estimated parameters (KIN, KIP) are evaluated to obtain data as to state deterioration of the catalytic converter.

11. The method of claim 10, wherein the desired value for the fill level of the catalytic converter is varied in dependence upon a state of the catalytic converter.

* * * * *

UNITED STATES PATENT AND TRADEMARK OFFICE
CERTIFICATE OF CORRECTION

PATENT NO. : 5,901,552
DATED : May 11, 1999
INVENTOR(S) : Eberhard Schnaibel, Erich Schneider, Ruediger Deibert, Hans Peter Geering, Christian Roduner and Esfandiar Shafai It is certified that error appears in the above-identified patent and that said Letters Patent is hereby corrected as shown below:

In column 3, line 47: delete "CK at", substitute -- CKat -- therefor.

In column 4, line 44: after "following", insert -- control rule results: --.

In column 4, line 45: delete the equation and substitute therefor:

-- $C(S) = G1 + \dfrac{G2 \cdot 1}{S} + \dfrac{G3 \cdot 1}{S^2}$ . --

In column 6, line 21: between "data" and "to", insert -- as --.

In column 6, line 31: delete "or" and substitute -- of -- therefor.

Signed and Sealed this

Eighth Day of May, 2001

*Attest:*

NICHOLAS P. GODICI

*Attesting Officer*  Acting Director of the United States Patent and Trademark Office